United States Patent
Hudson et al.

(10) Patent No.: US 7,174,224 B2
(45) Date of Patent: Feb. 6, 2007

(54) SMART CAMERA

(75) Inventors: Edison T. Hudson, Chapel Hill, NC (US); James McCormick, Barrington, RI (US); Ronald Genise, Raleigh, NC (US); Jerome Dahl, Raleigh, NC (US)

(73) Assignee: Adept Technology, Inc., Livermore, CA (US)

( * ) Notice: Subject to any disclaimer, the term of this patent is extended or adjusted under 35 U.S.C. 154(b) by 234 days.

(21) Appl. No.: 10/922,984

(22) Filed: Aug. 23, 2004

(65) Prior Publication Data

US 2005/0021157 A1    Jan. 27, 2005

Related U.S. Application Data

(60) Division of application No. 09/803,001, filed on Mar. 9, 2001, now Pat. No. 6,988,008, and a continuation-in-part of application No. 09/779,913, filed on Feb. 7, 2001, now abandoned.

(60) Provisional application No. 60/188,562, filed on Mar. 10, 2000, provisional application No. 60/188,580, filed on Mar. 10, 2000.

(51) Int. Cl.
*G01B 15/00* (2006.01)
*G05B 15/05* (2006.01)
*G05B 19/18* (2006.01)
*G05B 11/01* (2006.01)

(52) U.S. Cl. ............... 700/1; 700/19; 700/20

(58) Field of Classification Search .............. 700/1–3, 700/19–20, 9, 182–186, 195
See application file for complete search history.

(56) References Cited

U.S. PATENT DOCUMENTS

| | | | |
|---|---|---|---|
| 5,446,960 A * | 9/1995 | Isaacs et al. | 29/834 |
| 5,769,527 A * | 6/1998 | Taylor et al. | 362/85 |
| 5,842,060 A * | 11/1998 | White et al. | 396/155 |
| 5,974,169 A * | 10/1999 | Bachelder | 382/151 |
| 6,061,746 A * | 5/2000 | Stanley et al. | 710/10 |

(Continued)

OTHER PUBLICATIONS

Real time vision for intelligent vehicles Gavrila, D.M.; Franke, U.; Wohler, C.; Gorzig, S.; Instrumentation & Measurement Magazine, IEEE vol. 4, Issue 2, Jun. 2001 pp. 22-27.*

(Continued)

*Primary Examiner*—Anthony Knight
*Assistant Examiner*—Michael B. Holmes
(74) *Attorney, Agent, or Firm*—Oliff & Berridge, PLC (57) ABSTRACT

A smart camera system provides focused images to an operator at a host computer by processing digital images at the imaging location prior to sending them to the host computer. The smart camera has a resident digital signal processor for preprocessing digital images prior to transmitting the images to the host. The preprocessing includes image feature extraction and filtering, convolution and deconvolution methods, correction of parallax and perspective image error and image compression. Compression of the digital images in the smart camera at the imaging location permits the transmission of very high resolution color or high resolution grayscale images at real-time frame rates such as 30 frames per second over a high speed serial bus to a host computer or to any other node on the network, including any remote address on the Internet.

4 Claims, 4 Drawing Sheets

U.S. PATENT DOCUMENTS

| | | | |
|---|---|---|---|
| 6,456,892 B1* | 9/2002 | Dara-Abrams et al. | 700/83 |
| 6,556,875 B1* | 4/2003 | Nagasaka et al. | 700/19 |
| 6,788,980 B1* | 9/2004 | Johnson | 700/1 |
| 6,865,425 B2* | 3/2005 | McNutt | 700/1 |
| 2004/0263845 A1* | 12/2004 | Schaller et al. | 356/399 |

OTHER PUBLICATIONS

EMS-Vision: a perceptual system for autonomous vehicles Gregor, R.; Lutzeler, M.; Pellkofer, M.; Siedersberger, K.-H.; Dickmanns, E.D.; Intelligent Transportation Systems, IEEE Transactions on vol. 3, Issue 1, Mar. 2002 pp. 48-59.*

Vision-based vehicles in Japan: machine vision systems and driving control systems Tsugawa, S.; Industrial Electronics, IEEE Transactions on vol. 41, Issue 4, Aug. 1994 pp. 398-405.*

Developing intelligent micro-mechanisms Nicoud, J.-D.; Matthey, O.; Micromechatronics and Human Science, 1997. Proceedings of the 1997 International Symposium on Oct. 5-8, 1997 pp. 119-124.*

From multi-sensor serveillance towards smart interactive spaces Gandetto, M.; Marchesooti, L.; Sciutto, S.; Negroni, D.; Regazzoni, C.S.; Multimedia and Expo, 2003. ICME '03. Proceedings. 2003 International Conference on vol. 1, Jul. 6-9, 2003 pp. I—641-644 vol. 1.*

High-speed sensing system for depth estimation based on depth-from-focus by using smart imager Yokota, A.; Yoshida, T.;Kashiyama, H.; Hamamoto, T.; Circuits and Systems, 2005. ISCAS 2005. IEEE International Symposium on May 23-26, 2005 pp. 564-567 vol. 1.*

Pattern formation experiments in mobile actuator and sensor Pengyu Chen; Zhen Song; Zhongmin Wang; Yang Quan Chen; Intelligent Robots and Systems, 2005. (IROS 2005). 2005 IEEE/RSJ International Conference on Aug. 2-6, 2005 pp. 735-740.*

Rehabilitation robot FRIEND II—the general concept and current implementation Volosyak, I.; Ivlev, O.; Graser, A.; Rehabilitation Robotics, 2005. ICORR 2005. 9th International Conference on Jun. 28-Jul. 1, 2005 pp. 540-544.*

* cited by examiner

SMART CAMERA

INCORPORATION BY REFERENCE

This is a Divisional of application Ser. No. 09/803,001 filed Mar. 9, 2001 now U.S. Pat. No. 6,988,008, which is related to and claims the benefit of (1) provisional U.S. Patent Application Ser. No. 60/188,562 filed on Mar. 10, 2000 in the name of Edison T. Hudson, entitled "Smart camera", commonly assigned herewith; (2) provisional U.S. Patent Application Ser. No. 60/188,580 filed on Mar. 10, 2000 now abandoned in the names of Edison T. Hudson, James McCormick, Ronald G. Genise and Jerome Dahl, entitled "Hardware architecture and method for distributed machine control" commonly assigned herewith; and is a continuation in part of (3) U.S. Non-Provisional patent application Ser. No. 09/779,913 filed Feb. 7, 2001 in the names of Edison T. Hudson, James McCormick, Ronald G. Genise and Jerome Dahl, entitled "Hardware architecture and method for distributed machine control", commonly assigned herewith. The entire disclosure of the prior applications is hereby incorporate by reference herein in its entirety.

FIELD OF THE INVENTION

The present invention relates to machine control systems. The invention has broad applicability to machine systems requiring controllers which control actuators and/or monitor sensors. More particularly, the present invention is directed to electronic cameras. Still more particularly, the present invention is directed to machine vision systems employing electronic video cameras.

BACKGROUND OF THE INVENTION

Machine control systems are well known in the art. Such systems include, for example, systems for controlling robotic assembly equipment such as pick and place (or placement) machines. A placement machine is a robotic instrument for picking up electronic and similar parts from component feeders and placing them at their assigned locations on a printed circuit board (PCB). Once all parts are placed, the PCB is placed in a reflow oven and solder paste disposed on the PCB melts forming permanent electrical connections between pads on the PCB and electrical contacts, leads or "pins" on the electrical components.

At present, most machine control systems include physically large control circuits that are centrally located. Many wires and control cables must run between the centrally located control circuits and individual actuators (such as motors of various types), sensors (electronic, electro-optic and video), and like equipment. The result is that with complex systems, the cables which must be routed to various moving parts can be complex, heavy and take up large volumes. For moving parts, added weight increases the cost and size of motors which must be used to achieve a given function. In complex assembly equipment, added weight adds inertia to moving parts which must be precisely located rendering that task more difficult. Accordingly, it would be desirable to provide an architecture for machine control systems, which reduces mass, volume and electrical connections, required to achieve a given task. It would be particularly desirable to provide a smart camera capable of carrying out a video monitoring function together with on-board digital signal processing tasks such as compression, feature extraction, servo-loop control, and the like.

BRIEF DESCRIPTION OF THE INVENTION

A smart camera system provides focused images to an operator at a host computer by processing digital images at the imaging location prior to sending them to the host computer. The smart camera has a resident digital signal processor for preprocessing digital images prior to transmitting the images to the host. The preprocessing includes image feature extraction and filtering, convolution and deconvolution methods, correction of parallax and perspective image error and image compression. Compression of the digital images in the smart camera at the imaging location permits the transmission of very high resolution color or high resolution grayscale images at real-time frame rates such as 30 frames per second over a high speed serial bus to a host computer or to any other node on the network, including any remote address on the Internet.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a smart camera. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In accordance with the invention, a hardware architecture links control modules to a host computer in a high-speed serial bus network to achieve efficient distributed machine control. Each control module includes a communications unit and a function unit that are coupled to each other as a part of the control module. All communications units are similarly constructed with each having a unique identification set by a component thereof and provide communications between control modules and the host computer. The function unit of each control module is distinctly configured for executing functions specific to the particular control module to which it is attached. The high-speed serial bus provides deterministic synchronization of data transfers between control modules and the host computer using either an isochronous mode and protocol or an asynchronous mode with a fixed real-time clock issuing data requests at fixed time intervals. Data transfers do not require host computer involvement and can occur directly between control modules. Each control module maintains data blocks containing the desired control status from the host computer and the current state of all variables related to the particular control module. These data blocks are available to the host computer and each control module at fixed time intervals without the need for data requests. This permits near real-time intervention or change of state within the controlled machine processes.

Figure 1:
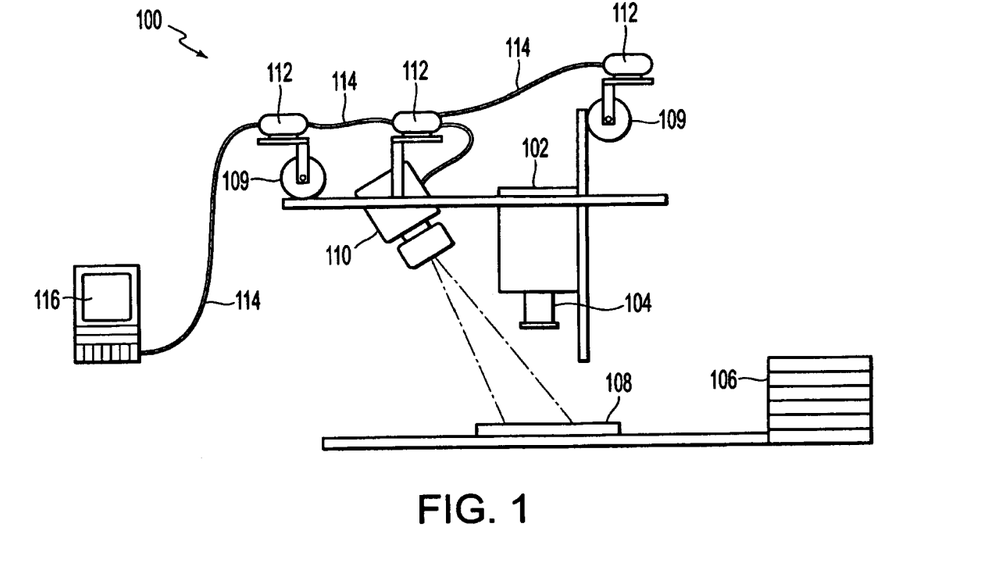
FIG. 1 is a schematic diagram of a machine control hardware architecture as applied to a placement machine in accordance with a specific embodiment of the present invention.

A specific embodiment of the machine control architecture of the present invention is illustrated in FIG. 1 as applied to a placement machine 100. The placement machine 100 has a pick-up head 102 transportable in X, Y, Z and T (rotational) directions which picks up components 104 (with a vacuum pick-up, gripper pick-up, or similar device) from component feeders 106 and transports them for placement onto a target substrate 108 such as a PCB. The components 104 in accordance with this example are typically electrical, electromechanical or electro-optic components and require highly accurate placement onto the target substrate 108 due to typically densely packed input/output (I/O) connections. The placement machine 100 has an imaging system 110 of some kind which observes the components 104 and the target substrate 108 in order to measure, register and align under-side contact and edge features of the components to corresponding target substrate features in order to achieve accurate placement. Placement machine 100 usually includes a number of control modules 112 for driving motors (also referred to as actuators) and sending and receiving digital and analog data. In addition, peripherals of placement machine 100 such as the imaging system 110, camera lighting (not shown), pick-up head 102 and vacuum generators (for use with vacuum pick-ups) may be wired to and controlled by specific data I/O lines of control modules 112. Real-time processing of images captured by the imaging system 110 permits calculation of coordinate feature locations for components 104 and target substrates 108 and corresponding control of the pick-up head 102 motion to achieve proper registration and alignment between the component 104 and target substrate 108.

Figure 2:
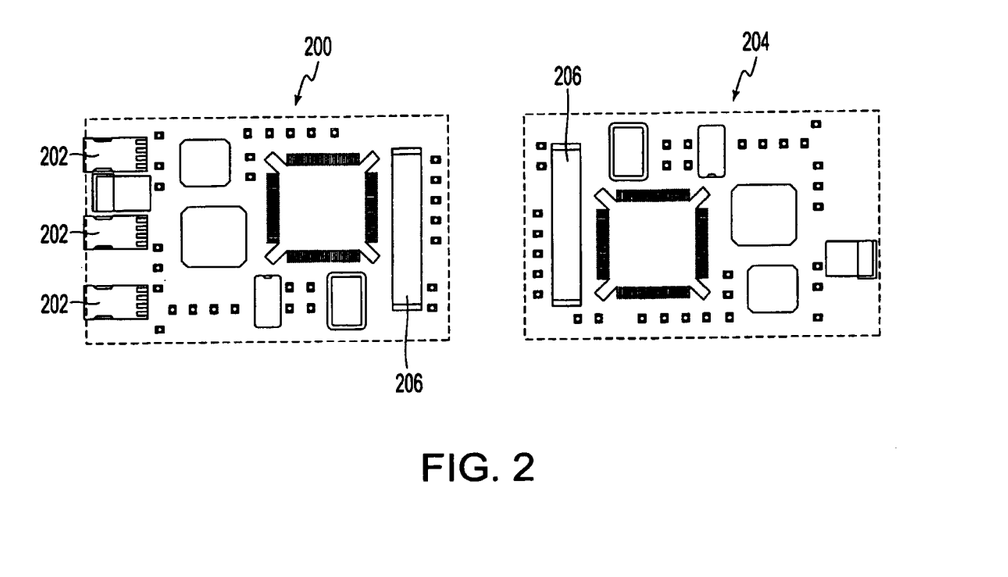
FIG. 2 is plan view of components of a hardware module including a common communications device and a unique function device in accordance with a specific embodiment of the present invention.

Control modules 112 are preferably positioned on or about the placement machine 100 at critical process locations such as motor control axes 109 and the imaging system 110 so as to minimize cabling. The control modules 112 are connected in a data communications network over a high-speed serial data bus 114 to each other and to a host computer 116. The data communications network may be a high speed network such as those defined in the IEEE Standard for a High Performance Serial Bus—Amendment 1 (IEEE Std. 1394a-2000 (Amendment to IEEE Std 1394-1995)) (Published by the Institute of Electrical and Electronics Engineers, Inc., 3 Park Avenue, New York, N.Y. 10016-5997 on Jun. 30, 2000) (hereinafter referred to as the "IEEE 1394 bus"), and the like. Each control module 112 includes a common communications device 200 which may be a single circuit board as illustrated in FIG. 2 that provides computing power, volatile and non-volatile data storage, and one or more communication ports 202 supporting the high speed serial bus 114. Each communications device 200 on each control module 112 preferably has the same or a similar physical configuration. The communications device 200 on each control module 112 is coupled to a function device 204 which may be a single circuit board using a standardized electrical and data interface 206 which performs signal conditioning, buffering, and power amplification functions. Each function device 204 is distinctly configured to execute functions specific to the particular control module 112 to which it is coupled. The combination of the common communications device 200 with a unique function device 204 constitutes a control module 112 that can perform a variety of functions. These functions include closed loop motion control of various types of motors using digital encoder, analog or video sensor feedback in combination with digital algorithms such as PID (proportional, integral, derivative) control providing real-time position, velocity and torque control and motor phase commutation. Machine vision functions using digital image acquisition and transmission without the use of specialized host resident hardware such as frame grabbers is of particular benefit in the placement machine 100 application. Other functional capabilities of the control module 112 include but are not limited to logic control with electrical opto-isolation for input or output signals, analog to digital and digital to analog conversion of voltage, current, or resistance from sensors or other electromagnetic sources, communication bridging and translation to and from other serial (or other) buses such as CANBUS, USB, RS232/422, and Ethernet, power control and amplification using pulse width modulation methods to create variable output levels of power for process functions such as lighting and heating, and real-time process variable control using any of the above digital or analog inputs or outputs.

The distinct configuration and corresponding functional capability of any one control module 112 is uniquely identified by a coded serial number that is hardware embedded and non-programmable in each module 112. Control modules 112 of the same type (i.e. modules having identical function devices 204 in addition to common communications devices 200) are also enumerated by a unique hardware embedded serial number. Each control module 112 transmits its coded serial number to the "root node" (which is usually host computer 116) upon a start-up initialization procedure causing the host computer 116 to assign a distinct network address to each control module 112. The host computer 116 then downloads appropriate control firmware that it has stored in an archive to the common communications device 200 in each control module 112 and thus configures the functionality and performance characteristics of each control module 112 as needed based on the application requirements for each control module 112. The capabilities of the host computer 116 controlled architecture combined with the "plug and work" nature of the control modules 112 and high-speed serial bus 114 permits a rapid configuration of many functions.

The high speed serial bus 114 linking the control modules 112 and host computer 116 has a high data transfer rate that typically ranges from about 100 megabits per second to about 3 gigabits per second (referred to herein as "high-speed"). In addition, the serial bus provides a mechanism for time deterministic data transfers such as the isochronous mode of an IEEE 1394 bus. In an IEEE 1394 bus isochronous mode, all real-time control system variables such as PID parameters, motion information and the state of digital and analog I/O are transferred from the host computer 116 to the control module 112 and vice versa at a fixed time interval using the isochronous protocol. Thus sensor data, captured by sensors coupled to digital or analog inputs of the control module, can be transferred to the host computer for use in calculations such as PID servo loops, machine vision algorithms, and the like. In an IEEE 1394 bus or similar serial bus, this can also be accomplished using an asynchronous mode of communication by establishing a fixed real-time clock that issues a read request to each control module 112 at a fixed time interval. Immediately following such a request, the control module 112 issues a write request to load its control variable data to the host computer 116.

In operation, the synchronous communication between the host computer 116 and physically remote control modules 112 over the high speed serial bus 114 occurs in a memory mapped fashion which emulates the remote control modules 112 being actually resident in host computer 116. Each control module 112 maintains an in-page data block containing a complete set or state table of the desired control state commands from the host computer 116 and an out-page data block containing the current state of all control variables within that particular control module 112. In addition, the host computer 116 maintains in-page and out-page data blocks for each control module 112 attached to the network. The time synchronized transmission mode of the hardware architecture guarantees that the state of each control module 112 is known within a deterministic time domain. Therefore all control variables are available to host computer 116 at a repeatable interval without requiring a specific request for such information. This permits near real-time intervention or change-of-state of any control variable for any control module 112 without the need to interrupt the normal stream of events at the control modules 112 or in the host computer 116. The updating or painting of the state of the in-page and out-page data blocks takes place at the lowest level in host computer 116 so as to have minimal impact on higher level functions. Unlike SERCOS (the well-known SErial Real-time COmmunication System), an open interface specification, designed for high-speed serial communication of standardized closed-loop data, or other known control protocols, no command interpretation or parsing and no polling is required. The updates are simply accomplished automatically and repeatedly at fixed time intervals. Therefore, system overheads at both host computer 116 and the control modules 112 are both minimal and constant with respect to computing resource demand.

Furthermore, the asynchronous and isochronous communication modes provided by the high-speed serial bus system, such as in the IEEE 1394 bus, permit a "peer-to-peer" communication. This means that no interaction with the host computer 116 is required to set-up or transfer data to any valid control module 112 within the network. These data transfers do not require permission from, redirection from or routing to the host computer 116. As an example, in the placement machine 100 application of FIG. 1, a motor control axis can receive position commands via direct state table or in-page data block updates from another control module 112 performing a sensor function with no host computer 116 interaction.

Additionally, the hardware architecture provides for data error checking with at least two error checks occurring at each transfer of data between a control module 112 and host computer 116. These error checks include a checksum on data integrity of the in-page data blocks and the out-page data blocks and a recirculating message sequence number for message order integrity between control modules 112 and the host computer 116.

Figure 3:
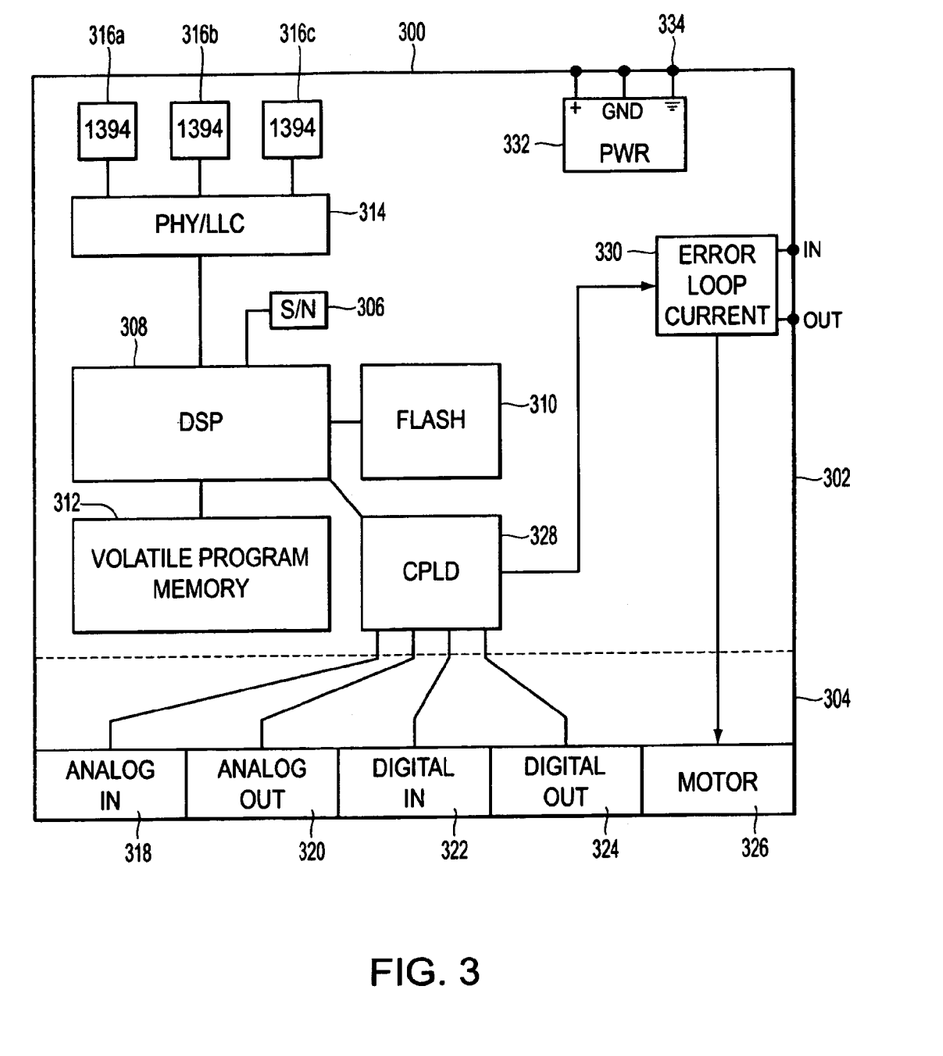
FIG. 3 is a system block diagram of a module in accordance with a specific embodiment of the present invention.

FIG. 3 is a system block diagram of a module in accordance with a presently preferred specific embodiment of the present invention. Module 300 includes a base processor/communications unit 302 and a function unit 304. Base processor/communications unit 302 may be present in each module present in a particular machine control system. Serial number chip 306 provides a unique serial number to processor/communications device 302. Digital signal processor (DSP) 308 may be a model TMS320F240 available from Texas Instruments. Flash memory 310 provides a bootstrap loadable program for initially configuring DSP 308 upon power-up. DSP 308 is generally programmed by the instructions in flash memory 310 to request download of software from a host computer after power-up and bootstrap load is completed. Once the software is downloaded from the host it is stored in volatile program memory 312.

DSP 308 communicates off-module via a conventional PHY (physical layer device) and LLC (link layer) 314 with serial ports 316a, 316b and 316c that may be 1394 bus serial ports and which together form a three-port IEEE 1394 bus hub of which some of the serial ports may be 4-wire (unpowered) ports and others may be 6-wire (powered) ports under the IEEE 1394 standard, as desired. To communicate with function unit 304 which in this embodiment is disposed on a separate PCB and connected to the PCB upon which processor/communications unit 302 is disposed via a multi-connector block connector that carries various signals and voltage levels. Function unit 304 may contain circuitry and ports supporting such communications activities as Analog Input (318), Analog Output (320), Digital Input (322), Digital Output (324), and various types of motor controls (326). DSP 308 may communicate with function unit 304 via a programmable logic device 328 in a conventional manner. In order to provide an emergency stop function to motorized equipment under control of module 300, motor control signals are preferably routed via error loop current block 330. If a low current signal routed through various components of the machine control system and through the "IN" and "OUT" ports of error loop current block 330 is interrupted, the signal(s) controlling the motorized components will cease to pass to the motorized components even if the DSP 308 has crashed or locked up. Error loop current block 330 operates, for example, by providing current to the gate of a switch transistor which allows motor control signals to pass from the switch transistor's source to drain. Other electrically controlled switch technologies (e.g., relays, opto-isolators, etc.) could be used as well as will now be apparent to those of ordinary skill in the art of circuit design. This feature is provided as a safety feature to provide a positive mechanism for motor shutdown in the case of an emergency or detected anomaly. Power block 332 receives power from an external source on lines "+" and "GND". Chassis ground input 334 is preferably isolated from "GND" input.

Figure 4:
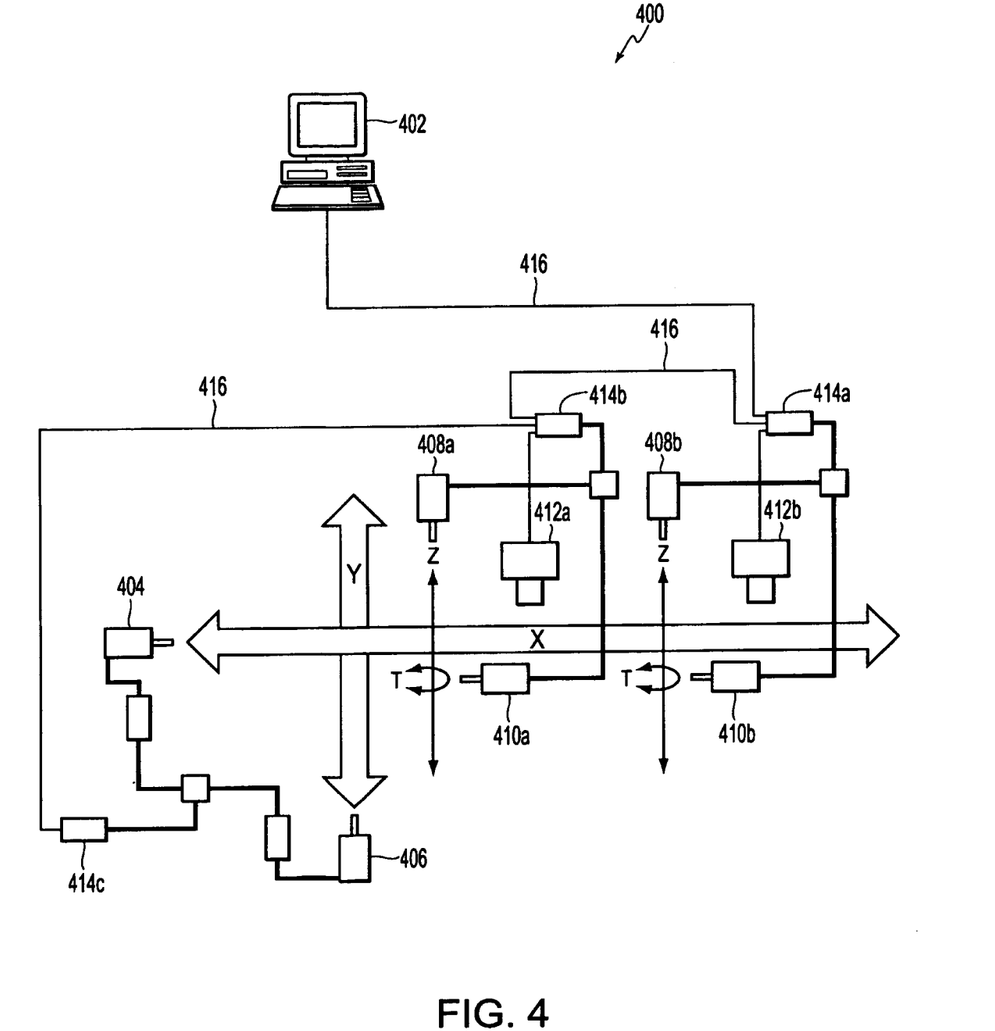
FIG. 4 is a schematic diagram of a distributed machine control system in accordance with a specific embodiment of the present invention.

FIG. 4 is a schematic diagram of a distributed machine control system in accordance with a specific embodiment of the present invention. FIG. 4 illustrates a typical application for the distributed machine control system of the present invention. A six axis motion system 400 under the control of a host computer 402 includes a number of actuators 404 (X-axis), 406 (Y-axis), 408a and 408b (Z-axis), and 410a and 410b (T-axis). Cameras 412a and 412b are IEEE 1394-type cameras and are present to provide machine vision control. Machine vision algorithms and servo-loops are preferably implemented by a corresponding control module (e.g., control module 414b processes machine vision for camera 412a). In this embodiment a number of control modules 414a, 414b and 414c provide control to the various actuators and cameras. Control modules 414a, 414b and 414c may be coupled to one another using an IEEE 1394 bus 416 including flexible serial data cables and may be connected in daisy-chain fashion or in a tree fashion.

In accordance with a specific embodiment of the smart camera system of the present invention imaging system 10 is modified to include a smart camera or image sensor which observes the components 104 and the target substrate 108 in order to measure, register and align under-side contact and edge features of the component to corresponding target substrate features. Real-time image processing of images captured by the smart camera with a digital signal processor located at the smart camera permits calculation of coordinate feature locations for components 104 and target substrates 108 and corresponding control of the pick-up head 102 motion to achieve proper registration and alignment between the component 104 and target substrate 108. In addition, the real-time image processing at the smart camera location permits the transmission of very high resolution color or high resolution grayscale images at real-time frame rates such as 30 frames per second over a high speed serial bus 114 to a host computer 116 or to any other node on the network, including any remote address on the internet.

The smart camera system of the present invention has fully digital camera system architecture which permits the use of a variety of different formats of image sensors coupled with a high speed digital signal processor for real-time image enhancement, compression, or feature extraction and a high speed serial communication bus for communicating the processed or raw images to a network host computer. The smart camera system architecture improves image signal to noise ratios by providing a very short signal path length (i.e. only a few millimeters) for the raw image data signal to travel from the imaging chip to a high speed analog to digital converter where it is converted into quantized raw image data and collated in a temporary storage buffer.

The buffer can then directly route the quantized raw image data for transmission over a high speed, isochronous serial bus such as an IEEE 1394 bus or equivalent. Alternatively, the quantized raw image data can be taken from the buffer by an embedded digital signal processor (DSP) for image processing. The DSP can interpret, filter, compress or otherwise modify the data in whatever manner selected by a user at a host computer. The DSP has a program and data storage that can be loaded with a library of firmware capable of performing a wide array of image processing computations on the image data. These computations include but are not limited to mathematical operations such as addition, subtraction and multiplication by a constant or by another image or partial image, compression including MPEG, JPEG, and GIF at various compression factors, convolution processes of various data array sizes, deconvolution processes such as wavefront coding and digital focusing, edge detection, filtering and enhancement, centroid location, region connectivity, hole finding, region statistics, intensity normalization, white balancing, saturation and hue adjustment, color interpolation from weighted color filter tables matching an image array filter pattern, feature extraction such as corner, arc, and line segment formation, image rotation, zooming functions, scaling functions, run length encoding, chain coding, morphological erosion, dilation, normalized correlation to stored templates, frame to frame motion detection, motion control vector offset calculations, user defined algorithmic sequences and the like. These functional computations can be selected and applied on-the-fly to incoming images. The results of the image calculations performed by the digital signal processor (i.e. the processed image) can then be routed to the high speed serial bus buffer for transmission to the host computer or any other node on the serial network, including any remote address on the internet.

Compression of the digital images in the smart camera at the imaging location by the embedded digital signal processor provides an enabling advantage for very high resolution images such as those with 4,000×4000 pixels. The compression enables the transmission of very high resolution color or high resolution grayscale images at real-time frame rates such as 30 frames per second over a high speed serial bus such as the IEEE 1394 bus to a host computer or to any other node on the network, including any remote address on the internet. Without the compression at the smart camera location by the embedded digital signal processor, the very high data rates generated by such high resolution color or high resolution grayscale images at real-time frame rates would not be transmittable within the available bandwidth of even the very high speed serial buses such as IEEE 1394.

Similarly, advanced image enhancement algorithms such as wavefront coding produce optical images that are not human interpretable without digital deconvolution. The embedded digital signal processor can implement the digital deconvolution so that the image transmitted to the host computer can be immediately displayed and viewed by a human operator in real time.

Additional advantages of the smart camera system of the present invention include compressing live, high resolution video images with greater than 1000×800 pixels containing 24 bits of color and intensity data per pixel generated at rates exceeding 20 frames per second, such that remote observation of the compressed images is enabled over networks of normally insufficient bandwidth, such as dial-up internet networks. Further, on-command compression may be suspended for one or more frames so that full resolution, non-compressed, single frames may be transmitted over the same network at less than real-time rates.

Figure 5:
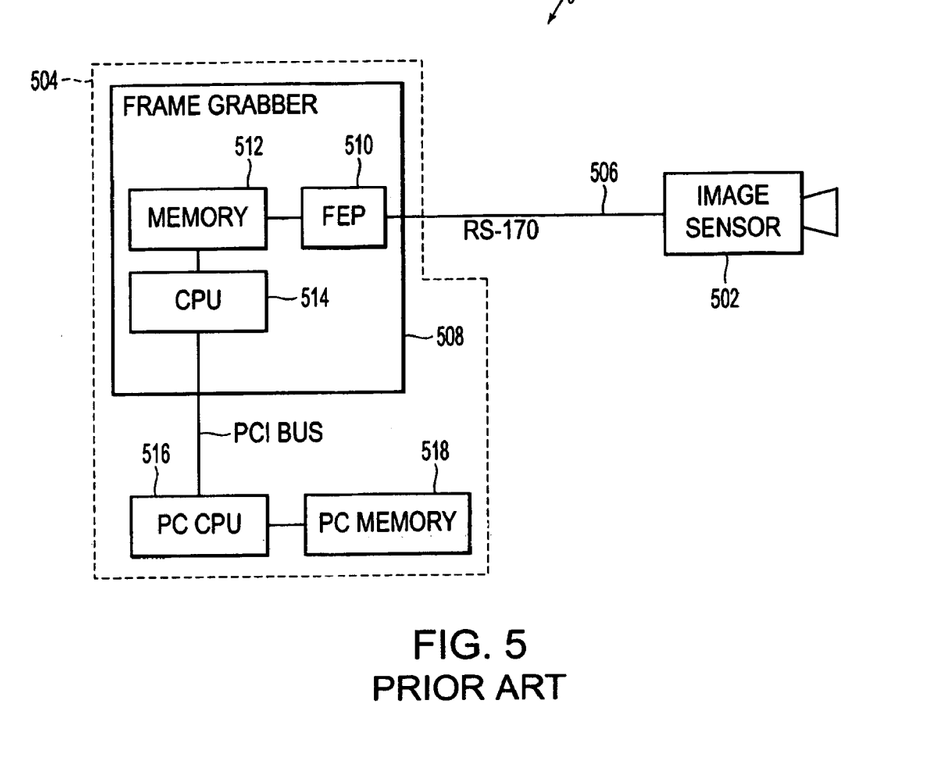
FIG. 5 is a block diagram of a camera-based imaging system in accordance with the prior art.

A prior art vision system 500 is illustrated in FIG. 5. An analog image sensor 502 obtains the image and transmits it to a host computer 504 over a cable or transmission line (e.g., of the RS-170 type) 506. The image data transmitted over cable 506 may be either in analog or digital format. The maximum resolution of the image and the frame rate are limited by the bandwidth of cable 506. The finite bandwidth of cable 506 causes jitter and delay in the image which, in turn, lowers the quality and timeliness of the image. The host computer 504 includes a frame grabber 508 which includes an FEP block 510 for performing conventional analog/digital conversion, gain control and balance. It also includes a frame memory 512 and a CPU 514 for handling basic tasks. The host computer 504 also includes a PC CPU 516 and PC Memory 518. The PC CPU 516 of the host computer 504 runs software programs that process the image data as desired. The host computer 504 uses the processed image data along with other sensor data as a part of the machine operation in controlling actuators.

Figure 6:
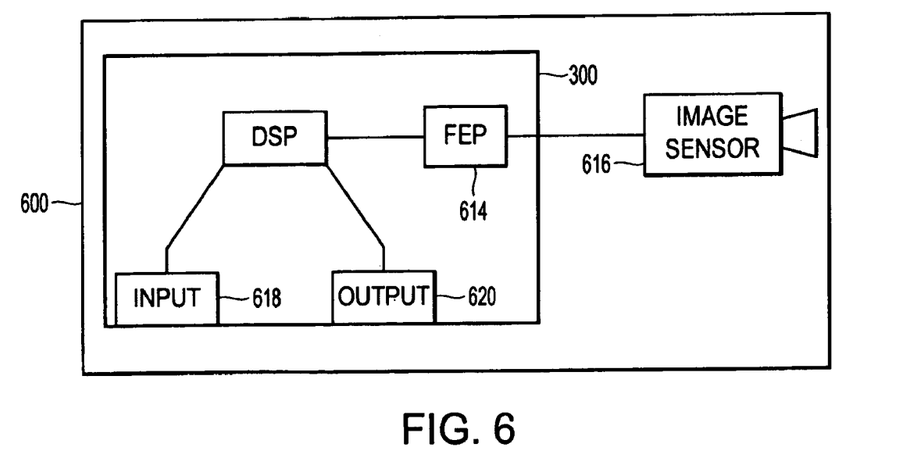
FIG. 6 is a block diagram of a smart camera system in accordance with a specific embodiment of the present invention.

The smart camera in accordance with a specific embodiment of the present invention is diagrammed in FIG. 6. Smart camera 600 moves the processing operation from a separate host computer physically distanced from the imaging sensor into the camera unit itself, thus eliminating the need for a host computer to process images. This has the advantage of eliminating the cable and its bandwidth limitations and allows processing of higher resolution images with higher frame rates. The jitter and delay problem is thus eliminated. In essence, smart camera 600 includes the essential parts of block 300 of FIG. 3 as shown.

Software to process the image data is downloaded over the serial bus via a conventional PHY/LLC 314 (FIG. 3) to a DSP 308 equipped essentially as discussed above in connection with FIG. 3. The DSP 308 receives data from FEP block 614 that handles analog/digital conversion, gain and balance for image information received from image sensor 616. The smart camera can receive commands and control information from other control nodes in a system without the need to work through a host computer. The smart camera module can also obtain sensor data directly from other sensors. The smart camera can process image data in real time, and, along with other sensor data, can send commands and control information directly to any actuators on the serial bus without a need to involve any host computer. By performing the signal processing inside the camera unit and controlling the actuators in that fashion, system performance is directly improved. Because raw image data does not go through the serial bus, the bandwidth limitation is eliminated—the image data is processed at the camera to a level that the serial bus poses no impediment to its transmission, e.g., through compression or feature extraction which tend to reduce the volume of the data. This advantage allows many smart cameras to be used in one system without any appreciable reduction in system performance.

By adding digital inputs and outputs (TTL or buffered lines) to the DSP processor 308, it becomes possible to synchronize the taking of images to external events or vice versa to a higher degree of time accuracy than would be possible using the IEEE 1394 serial bus structure alone. For example, a component may trigger a simple sensor input 618 such as a photoelectric switch as it enters the optical field of view of the image sensor. In such a case the closing of the switch can be used by directly linking the DSP 308 or camera timing trigger so as to cause an immediate commencement of image capture. For another example, at the exact instant that the camera begins to capture an image, the DSP 308 or camera timing hardware may provide an output signal 620 that causes a light source such as a strobe to flash to provide an exact stop motion image. In these two examples, the latency involved in using the network for camera control is reduced by the hardware inputs or outputs so as to substantially overcome any latency and thereby synchronize external events. The synchronizing signals can further be used by DSP 308 to capture the exact clock time or motion position (encoder value) at the instant that such lines are activated.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for distributed machine control, comprising:
controlling a first actuator with a first control module, said first module including a first processor carrying out a program of instructions and generating a first set of signals for controlling said first actuator;
controlling a second actuator with a smart camera module, said smart camera module including a second processor carrying out a program of instructions and generating a second set of signals for controlling said second actuator;
linking said first set of signals through a first error current block disposed in said first module to said first actuator, said first error current block receiving and transmitting an error current loop signal and interrupting said first set of signals if said error current loop signal is interrupted;
linking said second set of signals through a second error current block disposed in said smart camera module to said second actuator, said second error current block receiving and transmitting said error current loop signal and interrupting said second set of signals if said error current loop signal is interrupted;
detecting an error condition; and
interrupting said error current loop signal upon detection of said error condition.

2. The method in accordance with claim 1 wherein said detecting is performed at least by an emergency stop switch.

3. An apparatus for distributed machine control, comprising:
means for controlling a first actuator with a first control module, said first module including a first processor carrying out a first program of instructions and generating a first set of signals for controlling said first actuator;
means for controlling a second actuator with a smart camera module, said smart camera module including means for acquiring image data and a second processor carrying out a second program of instructions and generating a second set of signals for controlling said second actuator, said second program including instructions for processing the image data;
means for linking said first set of signals through a first error current block disposed in said first module to said first actuator, said first error current block receiving and transmitting an error current loop signal and interrupting said first set of signals if said error current loop signal is interrupted;
means for linking said second set of signals through a second error current block disposed in said smart camera module to said second actuator, said second error current block receiving and transmitting said error current loop signal and interrupting said second set of signals if said error current loop signal is interrupted;
means for detecting an error condition; and
means for interrupting said error current loop signal upon detection of said error condition.

4. The apparatus in accordance with claim 3 wherein said means for detecting includes at least an emergency stop switch.

* * * * *